United States Patent [19]

Namikawa et al.

[11] Patent Number: 4,639,908

[45] Date of Patent: Jan. 27, 1987

[54] HIGH DENSITY INFORMATION RECORDS MADE OF CONDUCTIVE RESIN COMPOSITIONS COMPRISING INORGANIC POWER STABILIZERS

[75] Inventors: Kazuhira Namikawa; Toshiaki Hamaguchi; Mutsuaki Nakamura; Akio Kuroda, all of Yokohama, Japan

[73] Assignee: Victor Company of Japan, Ltd., Japan

[21] Appl. No.: 679,490

[22] Filed: Dec. 7, 1984

[30] Foreign Application Priority Data

Dec. 10, 1983 [JP] Japan .................................. 58-232238

[51] Int. Cl.$^4$ .............................................. G11B 23/00
[52] U.S. Cl. ................................... 369/288; 523/174; 428/65; 346/134
[58] Field of Search ...................... 369/288; 346/135.1, 346/134; 523/174; 428/64, 65

[56] References Cited

U.S. PATENT DOCUMENTS 3,351,577 11/1967 Krumm ........................... 369/288 X

FOREIGN PATENT DOCUMENTS 135524 10/1979 Japan .................................. 369/288

*Primary Examiner*—Alexander S. Thomas
*Attorney, Agent, or Firm*—Lowe, Price, Leblanc, Becker & Shur

[57] ABSTRACT

High density information records made of vinyl chloride resin compositions which comprise conductive powder and inorganic compounds in the form of powder having an antacidic action and a predetermined average size. By this, dropout defects in the information record can be suppressed to a significant extent. The inorganic compounds are selected from calcium hydroxide, basic aluminum magnesium carbonate hydrate and hydrotalcite.

6 Claims, No Drawings

HIGH DENSITY INFORMATION RECORDS MADE OF CONDUCTIVE RESIN COMPOSITIONS COMPRISING INORGANIC POWER STABILIZERS

BACKGROUND OF THE INVENTION

1. Field of the Invention

This invention relates to information recording and more particularly, to high density information records of a variable electrostatic capacitance type, such as video or digital audio discs, on which an information signal is recorded as geometric variations.

2. Description of the Prior Art

In certain information playback systems of the electrostatic capacitance type, an information signal is recorded as geometric variations by forming pits in a spiral plane or groove or in concentric planes or grooves, thereby obtaining high density information records such as video or digital audio discs. The individual pits of the record are very small and are arranged in a very high density. When the geometric variations are tracked with a pickup stylus such as a diamond having an electrode, capacitive variations are established between the stylus and the record according to the geometric variations, so that the recorded information signal can be played back.

Several kinds of information signal records of the electrostatic capacitance type have been proposed for use in the above type of electrostatic capacitance playback system. In one such record medium, an electrode is provided on one or both surfaces of a record substrate on which geometric variations are press molded according to an information signal. This permits formation of an electrostatic capacitance to be established between the record electrode and an electrode of a pickup stylus. More particularly, the record substrate is covered with a thin metallic film having a thickness of several hundred angstroms on which pits are formed as desired, and also with a several hundred angstrom thick dielectric layer overlying the metallic film. The dielectric layer serves to prevent short circuiting of the electrodes and increase the dielectric constant between the electrodes. However, the record of this type requires a number of fabricating steps including press molding the record substrate, depositing the thin metallic film and the dielectric layer, and the like. Thus, the fabrication is complicated and troublesome with the need of a relatively large-scale manufacturing apparatus. Thus, production cost become very high.

Another type of known information record of the electrostatic capacitance type is one which is obtained by press molding conductive plastic compositions comprising polyvinyl chloride resins, lubricants and several tens percent of carbon black on which the information signal is recorded as geometric variations. In this type of record, an electrostatic capacitance is established between the electrode of a pickup stylus and the record itself. Thus, no steps of depositing a thin metallic film on the substrate are needed. In addition, because fine particles of carbon black are individually covered with the resin, the dielectric film is not necessary. Thus, this type of record can be simply manufactured at relatively lost costs.

However, when the record made of the known conductive resin composition comprising vinyl chloride resins and carbon black is set in a playback system and played back, dropout defects may be often experienced.

We made studies in order to clear up the causes of the dropout defects and found that the records of the electrostatic capacitance type obtained from conductive resin compositions comprising vinyl chloride resins and carbon black involved blisters by which the dropout defects were produced.

SUMMARY OF THE INVENTION

It is accordingly an object of the present invention to provide information records of an electrostatic capacitance type which are made of conductive resin compositions comprising vinyl chloride resins and carbon black but which are substantially free of dropout defects as may be experienced in the prior art records.

It is another object of the invention to provide information records which rarely deteriorate in quality of reproduced picture even when kept under severe environmental conditions.

It is a further object of the invention to provide information records using conductive resin compositions which have much improved thermal stability without causing a lowering of heat distortion temperature (H. D. T.).

In accordance with the present invention, there is provided a high density information record of an electrostatic capacitance type which comprises a record substrate on which signal information is recorded as geometric variations, the substrate being made of a conductive resin composition comprising a vinyl chloride resin, 5 to 30 parts by weight of a conductive powder and below 10 parts by weight of an inorganic compound of a metal of Groups II and III of the Periodic Table in the form of a powder having a size below 10 $\mu$m and an antacidic action whereby dropout defects of the record are greatly reduced.

DETAILED DESCRIPTION AND PREFERRED EMBODIMENTS OF THE INVENTION

Blisters formed in information records were found to result from a number of origins but most blisters were based on decomposition products from conductive resin compositions the information signal records. As described before, conductive resin compositions for these purposes generally comprise vinyl chloride resins and carbon black as a conductive material. The conductive carbon black has such a high DBP absorption, for example 280 ml/100 g, and has a highly developed structure. During the course of gelation, melting and dispersion operations using high-speed mixers or kneaders, the conductive resin composition itself generates considerable heat, so that the resin in the composition is apt to decompose, leading to unfavorable formation of blisters.

In order to suppress the decomposition phenomenon, a number of stabilizers and plasticizers were tested. However, it was found that even though the thermal stability of the conductive resin composition was merely increased by addition of such additives as mentioned above, it was not possible to completely suppress the decomposition when the composition was processed in high-speed mixers. More specifically, the composition tended to undergo decomposition at portions where abnormal heat was locally generated and the composition was not continually mixed. As a result, a dehydrochlorination reaction took place at the portions mentioned above and the resin in the composition was crosslinked while containing the carbon black powder therein, causing the composition to shrink. The decomposition product in the form of hardened resin particles was dispersed throughout the composition. According to the size and position of the particles, blisters were produced in final information record articles.

In view of the above fact, it may occur to one skilled in the art that little or no blisters are formed when the dehydrochlorination reaction merely caused by thermal decomposition of vinyl chloride resins is suppressed. However, even when stabilizers ordinarily used for these purposes are added to vinyl chloride resins, it is very difficult to suppress the dehydrochlorination reaction to a significant extent. More particularly, these known stabilizers can apparently suppress the dehydrochlorination reaction during the processing operation of ordinary resin compositions, or can fix the hydrochloric acid produced during the processing operation, by which the ordinary resin compositions are suppressed from pyrolysis. However, the pyrolysis of resin compositions comprising carbon black in amounts as large as several to several tens percent of the composition as used for information records of an electrostatic capacitance type cannot be suppressed. This is because the resin composition comprising carbon black is self-heated during the heating and melting operation thereof, so that it becomes very difficult to suppress the thermal decomposition or pyrolysis. Even organic tin thermal stabilizers which are now accepted as having a good stabilizing effect for various resin compositions are not adequate for the purposes of the invention. If the organic tin stabilizers are used in large amounts, the thermal decomposition time can be delayed to some extent but it is difficult to prevent the dehydrochlorination reaction. The use of the organic tin stabilizers in large amounts is also disadvantageous in that the heat distortion temperature lowers and a breeding phenomenon on the surface of final molding products takes place. Thus, it is not convenient to use organic tin stabilizers in large amounts.

We made a study to find out substances which were effectively usable in place of or in combination with the organic tin thermal stabilizers. As a result, it was found that inorganic compounds having the antacidic action such as oxides, carbonates, hydroxides, silicates and phosphates of metals of the Groups II and III, i.e. alkaline earth metals, metals of Group IIA and Group IIB and metals of Groups IIIA and IIIB, of the Periodic Table are very effective in suppressing the time of starting the dehydrochlorination reaction. Also, compound oxides and complex salts of the inorganic compounds are also useful. Needless to say, these compounds may be used singly or in combination. Examples of the inorganic compounds useful in the present invention include aluminium hydroxide, aluminium silicate, magnesium silicate, magnesium oxide, magnesium carbonate, magnesium hydroxide, hydrotalcite, basic aluminium/magnesium carbonate hydrates, and the like. These inorganic stabilizers may be used in combination with organic tin thermal stabilizers used for ordinary resin compositions. Typical examples of the organic tin stabilizers are dibutyl tin mercapto esters.

When the above-indicated inorganic compounds are added to vinyl chloride resin compositions comprising conductive powders and kneaded, the thermal stability of the resin composition is remarkably improved. Thus, these inorganic compounds are considered to serve as good thermal stabilizers for conductive vinyl chloride resin compositions.

The inorganic compounds including salts and oxides having the antacidic action and capable of neutralizing hydrochloric acid produced during a mixing or kneading operation of conductive resin compositions which causes the dropout defects are used in the form of powder. Preferably, the inorganic compounds should be highly dispersable. The size of the inorganic powder should be equal to or below the size of pits formed in the information record of the type to which the present invention is directed and is thus below about 10 $\mu$m. The inorganic compounds are generally used in amounts of from 10 to 0.05 parts by weight per 100 parts by weight of a vinyl chloride resin. Preferable examples of the inorganic compounds include calcium hydroxide, basic aluminium/magnesium carbonate hydrates as particularly indicated in examples appearing hereinafter and hydrotalcite.

The vinyl chloride resins suitable for the purposes of the present invention are vinyl chloride homopolymer and copolymers with other copolymerizable monomers ordinarily used for these purposes. Examples of the copolymers include vinyl chloride-vinyl acetate copolymers, vinyl chloride-ethylene copolymers, vinyl chloride-propylene copolymers, vinyl chloride-alkyl acrylate copolymers, graft copolymers of vinyl chloride monomer with acrylonitrile-styrene copolymers or ethylene-vinyl acetate copolymers, vinyl chloride-alpha-olefin copolymers, vinyl chloride-vinyl alcohol copolymers and the like.

Conductive powders may include, aside from carbon black, metal powders as ordinarily used in this art.

Aside from these essential components, stabilizers such as metallic soaps including calcium stearate, organic tin compounds such as dibutyl tin esters and the like, lubricants such as higher alcohols, fatty acids, esters thereof and polysaccharides may be added to the conductive resin composition.

The vinyl chloride resin, conductive powder, inorganic powder having the antacidic action and, optionally, other additives are mixed in a high speed mixer such as Henchel mixer by which the powders are sufficiently dispersed throughout the composition. Thereafter, the mixture is gelled and melted in a highly kneadable extruder and pelletized, followed by pressing in a press machine to obtain video or audio discs.

Because the inorganic powder is added to the resin composition, hardened particles which will cause dropout defects of the disc can be suitably prevented from formation.

The present invention is described in more detail by way of examples and comparative examples.

EXAMPLE 1

One hundred parts by weight of ethylene-vinyl chloride resin having an average degree of polymerization of 430 and an ethylene content of 1.5% (VE-N, by Tokuyama Sekisui Ind. Co., Ltd.), 20 parts by weight of conductive carbon black powder (CSX 150A3, by Cabot Co., Ltd. U.S.A.), 2 parts by weight of an ester of an aliphatic alcohol and a dibasic acid (Loxiol G-60, by Henchel Chemical Co., Ltd.), 1 part by weight of a high-molecular weight ester (Loxiol G-71, by Henchel Chemical Co., Ltd.), 5 parts by weight of a dibutyl tin beta-mercapto ester stabilizer (Stann JF-95K, by Sankyo Organic Synthesis Co., Ltd.) and 1 part by weight of calcium hydroxide powder were mixed and sufficiently agitated to obtain a conductive resin composition.

EXAMPLES 2-4

The general procedure of Example 1 was repeated using, instead of the calcium hydroxide, hydrotalcite (Kyowaard 500, by Kyowa Chem. Ind. Co., Ltd.) of the formula, $Mg_6Al_2(OH)_{16}CO_3.4H_2O$ (Example 2), basic aluminium/magnesium carbonate hydrate (DHT-4A, by Kyowa Chem. Ind. Co., Ltd.) of the formula, $Mg_{4.5}Al_2(OH)_{13}CO_3.5H_2O$ (Example 3), and an aluminium magnesium carbonate of the formula, $Mg_{1-x}Al_x(OH)_2(CO)_{x/2}.mH_2O$ in which $x=0.33$ and $m=0.1-0.5$ (Alkamizer, by Kyowa Chem. Ind. Co., Ltd.) (Example 4), thereby obtaining three conductive resin compositions.

EXAMPLE 5

One hundred parts by weight of an ethylene-vinyl acetate-vinyl chloride graft copolymers (Toss Ace GK, by Tokuyama Sekisui Ind. Co., Ltd.) having an average degree of polymerization of 500 and a content of ethylene and vinyl acetate copolymer of 3.2%, 20 parts by weight of conductive carbon black (CSX-150A3, by Cabot Co., Ltd. U.S.A.) 5 parts by weight of a dibutyl tin mercapto ester stabilizer (RES-1, by Sankyo Organic Synthesis Co., Ltd.), 2.0 parts by weight of a fatty acid-glycerine ester lubricant (RES-210, Riken Vitamins Co., Ltd.), 0.5 part by weight of a fatty acid-alcohol ester lubricant (RES-310, by Kao Soaps Co., Ltd.), 1 part by weight of dimethylsiloxane (RES-421, by Shinetsu Chemical Co., Ltd.) and 1 part by weight of DHT-4A were mixed together and agitated to obtain a conductive composition.

EXAMPLES 6-7

The general procedure of Example 5 was repeated except that Alkamizer II was used instead of DHT-4A in amounts of 0.5 parts by weight (Example 6) and 1 part by weight (Example 7), thereby obtaining conductive resin compositions.

COMPARATIVE EXAMPLE 1

The general procedure of Example 1 was repeated without use of calcium hydroxide powder.

COMPARATIVE EXAMPLE 2

The general procedure of Comparative Example 1 was repeated except that the Stann JF-95K stabilizer was used in an amount of 6 parts by weight.

COMPARATIVE EXAMPLE 3

The general procedure of Example 5 was repeated without use of DHT-4T.

The conductive resin compositions of Examples 1-4 and Comparative Examples 1-2 were, after the mixing and agitation, subjected to a test for determining the time before the dehydrochlorination started by the use of the Brabender Plastograph. The results of the test are shown in Table 1 below.

The Brabender Plastograph used is of the PLV 151 type using a roller mixer W-50H which was operated under conditions of a preset temperature of 180° C., a rotor frequency of 20 r.p.m. for 1 minute and 60 r.p.m. thereafter and a an amount of each sample of 57 g.

TABLE 1

| | Stabilizer | Time Before Commencement of Dehydrochlorination |
|---|---|---|
| Ex. 1 | Stann JF-95K 5.0 wt % + calcium hydroxide 1.0 wt % | 9'45" |
| Ex. 2 | Stann JF-95K 5.0 wt % + Kyowaad 500 1.0 wt % | 11'00" |
| Ex. 3 | Stann JF-95K 5.0 wt % + DHT-4A 1.0 wt % | 11'00" |
| Ex. 4 | Stann JF-95K 5.0 wt % + Alkamizer II 1.0 wt % | 11'30" |
| Comp. Ex. 1 | Stann JF-95K 5.0 wt % | 8'00" |
| Comp. Ex. 2 | Stann JF-95K 6.0 wt % | 9'00" |

Similarly, the conductive compositions of Examples 5-7 and Comparative Example 3 were subjected to the thermal stability by the use of the Brabendar Plastograph. The results are shown in Table 2 below.

TABLE 2

| | Time Before Commencement | Thermal Decomposition Time | Resin Temperature in Stationary Torque State |
|---|---|---|---|
| Ex. 5 | 12'45" | 55'00" | 194.4° C. |
| Ex. 6 | 9'15" | 46'00" | 195 |
| Ex. 7 | 13'00" | 57'45" | 193.2 |
| Com. Ex. 3 | 7'15" | 45'30" | 193 |

The conductive resin compositions of the examples and comparative examples were each blended in a 20 liters Henchel high speed mixer and pelletized in a kneader PR-46 available from Buss Company, Limited, Switzerland. The resulting pellets were passed through a metal detector to eliminate metals and metal-containing pellets and press molded by a press machine for video discs to obtain video discs. The discs were allowed to stand at room temperature for 72 hours and set in a playback system to check a ratio of discs showing dropouts not less than 3H. As a result, it was found that the ratio was as small as 4 discs per 100 discs with regard to the video discs obtained from the examples of the invention but was as large as 11 discs per 100 tested discs for the video discs of the comparative examples. In addition, a large number of blisters in one disc were observed for the comparative examples.

What is claimed is:

1. A high density information record of an electrostatic capacitance type which comprises a record substrate on which signal information is recorded as geometric variations, the substrate being made of a conductive resin composition comprising a vinyl chloride resin, 5 to 30 parts by weight of a conductive powder and not greater than 10 parts by weight of an inorganic stabilizer capable of suppressing a dehydrochlorination reaction occurring in the vinyl chloride resin during a processing operation and capable of fixing hydrochloric acid produced during the operation, said inorganic stabilizer being selected from the group consisting of calcium hydroxide, basic aluminum magnesium carbonate hydrate and hydrotalcite and being in the form of a powder having an average size below 10 μm and an antacidic action, both based on 100 parts by weight of the vinyl chloride resin, whereby dropout defects of the record are greatly reduced.

2. The information record according to claim 1, wherein the amount of the stabilizer is in the range of from 10 to 0.05 part by weight.

3. The information record according to claim 1, wherein said inorganic compound is used in combination with an organic tin ester stabilizer.

4. The information record according to claim 1, wherein the conductive powder is carbon black powder.

5. The information record according to claim 1, wherein said inorganic stabilizer is basic aluminum magnesium carbonate hydrate.

6. The information record according to claim 1, wherein said inorganic stabilizer is hydrotalcite.

* * * * *